United States Patent

[11] 3,598,087

| [72] | Inventor | Forrest L. Ramser<br>Milford, Ind. |
|---|---|---|
| [21] | Appl. No. | 807,679 |
| [22] | Filed | Mar. 17, 1969 |
| [45] | Patented | Aug. 10, 1971 |
| [73] | Assignee | Chore-Time Equipment, Inc.<br>Milford, Ind. |

[54] RESTRICTED FEEDING APPARATUS
14 Claims, 7 Drawing Figs.

| [52] | U.S. Cl. | 119/51.11,<br>119/56 R |
|---|---|---|
| [51] | Int. Cl. | A01k 05/02 |
| [50] | Field of Search | 119/51, 52,<br>56, 51.11, 53; 198/64, 213, 215 |

[56] References Cited
UNITED STATES PATENTS

| 2,801,610 | 8/1957 | Wallace et al. | 119/51 |
| 2,867,314 | 1/1959 | Hansen | 198/64 |
| 2,970,532 | 2/1961 | Skelton | 99/235 |
| 3,033,163 | 5/1962 | Hostetler et al. | 119/52 |
| 3,330,255 | 7/1967 | Scott et al. | 119/51.11 |
| 3,415,228 | 12/1968 | Myers | 119/51.11 |

Primary Examiner—Aldrich F. Medbery
Attorney—Olson, Trexler, Wolters and Bushnell ABSTRACT: Feed dispensing apparatus of the automatic type which provides for the restricted feeding of poultry or the like, viz., the supplying of a predetermined quantity of feed at a preselected period. The apparatus includes a storage hopper, conveyor means, feed dispensing stations and a control system to achieve the desired end result. Said control system provides means whereby feed will be supplied to the poultry on demand, but upon the dispensing of a preselected quantity of feed, the apparatus is disabled until the next feeding cycle. In addition, there are means to achieve equal distribution of the feed along a conveyor line.

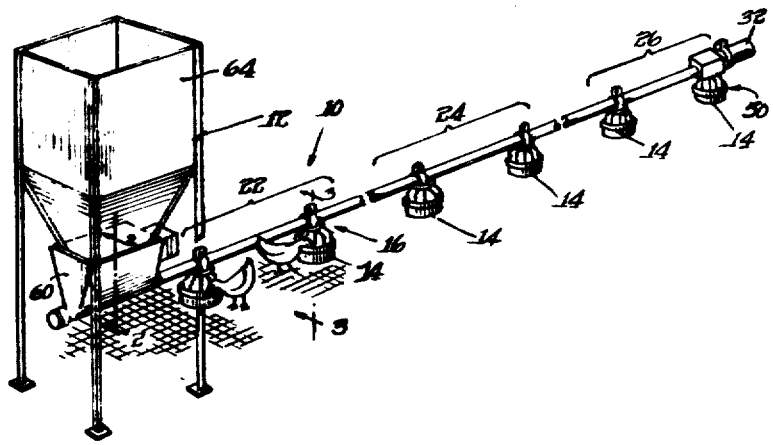

PATENTED AUG 10 1971

Inventor
Horrest L. Ramsey
By: Olson, Trexler, Wolters & Bushnell attys.

RESTRICTED FEEDING APPARATUS

BACKGROUND OF THE INVENTION

This invention relates generally to feed dispensing apparatus, and more particularly to apparatus for providing a restricted quantity of feed to poultry or the like at a prescribed period or periods during the day.

Mechanical poultry feeders are known in the art and generally include a series of conveyors which are supplied with feed from a common source or bin. These conveyors are driven by motors to distribute the feed to a plurality of outlets or feeding stations, each conveyor serving a set number or series of said stations. Feed pans or troughs are incorporated with the feeding stations to receive the feed from the conveyors, such that the poultry can readily consume the feed from said pans or troughs.

The controlling of the distribution of feed to the pans or troughs is commonly done by means of a cutoff switch which is located at a control feeding station in each series. The cutoff switch is in circuit with the conveyor motor and is actuated when a predetermined quantity of feed has accumulated in the feed pan at the control feeding station. Actuation of the cutoff switch interrupts the power circuit to the particular conveyor drive motor associated with said control station, thus stopping the conveyor and the distribution of feed to the stations associated therewith, to prevent the pans or troughs from being filled to overflowing which results in a needless waste of the feed. When the poultry have consumed enough feed to reduce the quantity at the control station below said predetermined level, the cutoff switch is released and the feed conveyor again energized to raise the level of feed at all the feeding stations in the series.

In the above-described system, which has proven satisfactory in many mechanical poultry feeder installations, the quantity of feed distributed is regulated as a function of the rate at which feed is consumed by the poultry. With such a system, feed is continuously supplied so long as it is being consumed or demanded by the poultry, the poultry being free to consume as much feed as they desire. In many situations, however, the efficient distribution of feed and raising of the birds requires that only a predetermined amount of feed be supplied at specified periods during the day. This form of poultry management is often referred to in the art as restricted feeding.

A restricted feeding program for pullets is necessary in order to obtain maximum egg production with relation to the feed consumed. The egg producing poultry found in most laying houses today have been bred to grow quite rapidly. But, since heavy, overgrown birds are not the best producers, in order to achieve maximum production from a given quantity of feed it is desirable to closely regulate the weight of the birds, both during the growing period and after maturity has been reached.

During the growing period, restricted feeding delays development and maturity of the birds, and helps keep them uniform in size, weight and overall development. This close control helps a flock of egg producers to reach their peak of production in just a few weeks after feeding begins. Once breeder hens have reached maturity, restricted feeding is employed to provide the hens with enough feed to maintain their bodies and to provide top egg production, but no more.

Accordingly, to achieve the above discussed objectives the mechanical feeders should be operated at predetermined feeding times to accumulate a predetermined quantity of feed at the feeding station. Once this predetermined quantity of feed has been accumulated, the apparatus should be rendered inoperative until the next succeeding predetermined feeding cycle.

While restricted feeding apparatus has been employed successfully with systems of the general type discussed above, it can be appreciated that in order to attain a high degree of feed control the feed should be supplied to the feeding stations equally—such was not the case with prior art constructions. The feed conveyor or dispensing arrangements employed with the prior art mechanical poultry feeders normally include flexible auger means housed within a plurality of elongate, interconnected tubular sections. A motor is employed to drive the flexible auger means, which is in communication with a hopper or bin for the feed and is effective to transport the feed along the length of the tubular sections. The practice in the prior art was to provide a plurality of openings in the tubular sections such that the feed would be dispensed from said openings into feed pans or troughs at the respective feeding stations. The aforementioned openings are positioned at the lowermost point on the circumference of the tubing sections such that their centers more or less lie in a vertical plane. The net result of this arrangement is that the individual feeding stations are filled successively. That is to say, the station closest to the bend will be filled prior to a station more remote therefrom. Accordingly, to insure that all of the stations were adequately filled it was necessary to monitor the feeding at the last station in the series. However, before this station was filled, the poultry will have commenced to feed at the other stations, such that the stations closest to the hopper receive a slightly greater quantity of feed.

SUMMARY OF INVENTION

Accordingly, the present invention provides a feeding system which will obviate the problems discussed above, and further provide the breeder with means to attain an effective restricted feeding program. These objects and advantages are realized by the provision of apparatus comprising: a hopper designed to accommodate a quantity of feed and having a discharge opening; conveyor apparatus, including drive means, associated with said discharge opening for transporting feed from said hopper to a plurality of feed stations; and a control system for said feed dispensing apparatus, said control system including first and second control means, said first control means being associated with at least one of said feed stations and operable to permit energization of said drive means whenever the amount of feed at said station is below a preselected level, said second control means being associated with said hopper and operable upon the reduction of feed in said hopper below a predetermined level to disable said drive means whereby only a prescribed amount of feed will be dispensed. In addition, the present invention provides means to permit the equal distribution of feed along the length of the conveyor.

DESCRIPTION OF THE DRAWINGS

FIG. 1 is a perspective view of a single feeder line of a mechanical poultry feeder system, which system would normally employ a plurality of said lines.

FIG. 2 is an enlarged, fragmentary cross-sectional view taken along the line 2-2 of FIG. 1.

FIG. 3 is an enlarged fragmentary sectional view taken along the line 3-3 of FIG. 1.

FIGS. 4, 5 and 6 are sectional views taken through the sections of tubing which make up the conveyor, and illustrating the disposition of the dispensing apertures in said sections.

FIG. 7 is a schematic illustration of one portion of a control circuit utilized in conjunction with an overall feeder system employing a plurality of feeder lines of the general type shown in FIG. 1.

DESCRIPTION OF THE ILLUSTRATED EMBODIMENT

Turning now to the drawings in greater detail, there is shown in FIG. 1 a perspective view of a single feeding line 10 for a mechanical poultry feeder system. It should be understood that the present invention pertains to systems which employ a plurality of such lines, all of which are controlled by a central timing arrangement.

The feeding line 10 includes generally, a hopper or bin construction 12, a plurality of feeding stations 14, and a conveyor system, designated generally 16. The quantity of feed to be dispensed is stored in the hopper 12, and is transported therefrom by the conveyor system 16 to the individual feeding stations 14.

The conveyor system 16 for each line 10 is similar to those known in the art, and in conjunction with the description of the illustrated embodiment to follow, reference is made to the detailed description of this type of conveyor system as can be found in U.S. Pat. No. 3,033,163. More specifically, as can be seen in FIG. 2, conveyor system 16 includes a flexible, elongate auger or screw member 20 which is carried or housed within a plurality of interconnected, elongated tubular sections 22, 24 and 26. One end of the auger member 20 extends through a discharge opening 28 in the hopper 12 so as to be placed in communication with the quantity of feed 30 stored therein. The elongate auger member 20 extends through the interconnected tubular sections 22, 24 and 26, and at the other end thereof is operably connected to the conveyor drive motor 32.

A plurality of dispensing apertures are provided along the lengths of the respective tubing sections, these apertures being designated generally 36. Each said aperture 36 is in communication with one of the feeding stations 14, substantially in the manner illustrated in FIG. 3. However, it should be noted that the circumferential disposition of the apertures 36 varies along the length of the conveyor 16 in a manner and for a purpose to be detailed hereinafter, and reference is made to FIG. 3 at this time merely to illustrate the general configuration of feeding stations 14.

Accordingly, with continued reference to FIG. 3, it can be seen that each feeding station 14 includes a feeding pan 42 having a centrally disposed conelike portion 44 which facilitates the distribution of the feed evenly about the circumference of the pan for ultimate consumption by the birds. In order to convey the feed 30 from a section of tubing to pan 42, each station 14 has a cylindrical feed diffusing assembly 46, which is disposed substantially vertically with respect to said pan.

The diffusion assembly 46 includes an arcuate collarlike member or portion 48 which is engaged about the outer periphery of the respective tubing section in overlying relation to the dispensing aperture 36. Thus, when the elongate auger 20 is operated the screwlike convolutions thereof will drive or convey the feed 30 from the hopper 12 along the length of the conveyor 16. The feed will be dispensed into the feed diffusing assembly 46 through opening 36, and from there to pans 42.

As was mentioned previously, it is the practice in the art to select one of the feeding stations 14 to function as a control station, such that the amount of feed supplied thereto is monitored and the rate of supply adjusted accordingly. Prior art systems had the conveyor dispensing openings in the lowermost portion of the tubing sections, viz., all of the openings were disposed with their centers substantially in a vertical plane. Accordingly, it was necessary to select the endmost feed station as the control station. Such was necessitated by the fact that with the dispensing apertures disposed in this manner the stations were filled successively and effective monitoring could only be achieved with regard to the last station in the series. In the illustrated embodiment the feeding station most remote from the hopper 12 functions as the control station, and is designated 50. This is in keeping with the prior art practices, as illustrated in the aforementioned U.S. Patent. However, as will be appreciated from the following description, since one feature of the present invention is the provision of means to achieve equal distribution of feed, any station may be selected as the control or monitoring station 50.

A switch arrangement or some other form of control means, designated 52 in FIG. 7, is provided at the control station 50, such that it is actuated by the accumulation of a prescribed quantity of feed. Once the switch 52 is actuated, it is effective to deenergize the conveyor motor 32 to discontinue the supply of feed to the respective feeding stations. As the feed at the control station 50 is consumed by the poultry, the level thereof drops and eventually switch 52 is indexed back to its original position which again permits motor 32 to operate. Thus, it can be seen that as far as control means 52 is concerned, feed will be supplied to the feeding stations 14 on demand.

Insofar as the preceding description is concerned, mechanical poultry feeders of the general type described are known in the art —see the aforementioned U.S. Patent. Accordingly, attention is now directed to the improvements which comprise the present invention. As will be recalled from the introductory discussion, the present invention is concerned primarily with a feeding system for the restricted or controlled feeding of poultry stock, i.e., the supplying of a predetermined amount of feed at predetermined times. Also, it should be kept in mind that a complete feeding system of this type includes a plurality of feed lines 10, with a master timer or the like controlling the overall system. The master timer, which will be discussed more fully hereinafter with regard to FIG. 7, permits the various conveyor systems to be energized at a selected time of the day in order to supply feed to the stations 14.

Since with restricted feeding it is desirable to supply only a measured quantity of feed to each line, and that this measured quantity be equally distributed with respect to the individual feeding stations 14, the master timer is adjusted such that its contacts remain closed for a length of time sufficient to allow the feed stored in all of the respective hoppers to be dispensed. However, the supply of feed in the respective lines will not be consumed and/or dispensed at the same rate, as the situations will vary depending upon the number of poultry feeding off an individual line; the age or stage of development of said poultry; and various other factors. Thus, a significant period of time will elapse between the first instance of complete dispensing and the last. To accommodate this possible variance in time, the timer must be set so that its contacts remain closed for a sufficient period to permit all of the lines to complete the dispensing procedure.

With the above discussion in U.S. it can be appreciated that it is undesirable and economically disadvantageous to have all of the conveyors operating during the period the timer contacts are closed. If such was the case, a considerable amount of the running time of a conveyor would be after all the feed had been dispensed, the conveyor being kept in operation only to accommodate the last of the series of feed lines to complete dispensing. the present invention provides a system which avoids this problem.

Turning first to FIG. 2, it can be seen that the hopper 12 includes a boot 60 which is associated with an opening 62 in the bottom wall of an upper hopper portion 64. The boot 60 has the hopper dispensing opening 28 formed therein with the first section of tubing 22 for conveyor 16 coupled thereto in communication with said opening. The elongate, auger member 20 extends through said opening 28 into the lower portion of the boot 60. Thus, it can be seen that as the auger 20 is rotated the feed 30 will be transported out of the boot 60 and into the first tubing section 22 and therealong for dispensing to the various feed stations 14.

A normally open switch arrangement 70 or some other form of control means is provided in association with the boot 60. When the hopper 12 is filled said switch 70 will be biased to the closed position and will remain closed until all, or substantially all, of the feed 30 has been transported from the hopper 12 to the various feed stations 14. Switch 70 is operably associated with the conveyor motor 32, such that said motor is disabled or deenergized when said switch is opened. One form of this operable association is illustrated in FIG. 7, and will be detailed hereinafter.

In the illustrated embodiment of control arrangement 70, an opening 72 is formed in a sidewall of the boot 60 and a flexible diaphragm 74 placed thereover. The switch arrangement 70 includes a spring-biased actuator or plunger member 76 and a contact assembly 78. The switch arrangement 70 is such that the actuator arm 76 engages against the diaphragm 74 causing same to protrude into the interior of the boot portion 60. Thus, when feed is introduced into the hopper 12 the weight thereof will force the actuator 76 against the action of spring 75 causing the contacts 78 to close. Once the level of feed is reduced to a point below the actuator 76, the action of the spring 75 will open the contacts 78.

Directing attention now to FIG. 7, the schematic illustration therein represents a preferred form of control system for one line of an overall feeding arrangement. The conveyor drive motor 32 is placed in series with the switch arrangement 52 of the control station 50, the switch arrangement 70 of the boot 60, and the master timer, designated generally 80. The leads 82 are associated with a source of power, such that motor 84 of timer 80 may be energized and operated. Motor 84 includes a cam arrangement or some other mechanical linkage (not shown) which will close the contacts of the normally open timer switch 86 at a selected time and for a preset period. Upon the closing of timer switch 86 power will be supplied to the line 90, which serves the illustrated arrangement, and the various other feeding lines of the overall system. If the control means or switches 52 and 70 are in the closed position, as illustrated, the conveyor motor 32 will be energized via lines 92, 94 and 96. Accordingly, at this point in the cycle the dispensing of feed from hopper 12 will commence.

It will be recalled, from the preceding discussion, that the switch arrangement 52 is normally closed switch which will be opened only when the feed at the control feeding station 50 reaches a predetermined level. Thus, when said level is reached and switch arrangement 52 is opened motor 32 is deenergized and the dispensing of feed ceases. As feed is consumed at the control station 50, switch arrangement 52 will index to the closed position to again energize conveyor motor 32 and dispense feed to the various feeding stations 14. From this it can be appreciated that the control means provided by switch arrangement 52 permits the conveyor system to be operated on demand, irrespective of the amount of feed dispensed.

Attention is now directed to the control means provided by the switch arrangement 70, which is placed in circuit with both switch 52 and the motor 32, such that when switch 70 is opened the conveyor motor 32 is disabled, irrespective of the condition of switch 52. Thus, when the level of feed in the hopper 12 is such as to permit the switch 70 to open dispensing can no longer take place until more feed is supplied to the said hopper. From this, it is believed clear that the control means provided by switch 70 permits only a selected amount of feed to be distributed, and that the two control means 52 and 70 work in conjunction to achieve the desired restricted feeding procedure.

Upon viewing the illustrated arrangement, from FIG. 2 it can be seen that the switch arrangement 70 will be biased to the open position before all of the feed 30 has been dispensed, with the amount of feed 30 remaining in the boot portion 60 and the conveyor 16 being relatively insignificant. However, it should be noted that after initial operation of the system, this amount of feed remaining in the boot 60 and conveyor 16 becomes a constant parameter than can be taken into account with each succeeding feeding cycle. That is to say, if a prescribed amount of feed is placed in the hopper 12, it can be seen that when switch 70 opens approximately that amount, and no more, will have been dispensed. On the other hand, switch arrangement 70 may be of a known type which will remain closed for a short duration after the biasing force becomes insufficient to keep the contacts 78 closed, whereby all of the feed will be dispensed.

Directing attention now to FIGS. 4—6, it will be recalled from the preceding discussion that in prior art mechanical poultry feeder arrangements the tubular sections were positioned such that the dispensing apertures opened vertically downward, and that the respective feeding stations were filled individually. Such was the case, since very little feed would bypass the first opening in the conveyor until feed had accumulated to the level of the opening 36. With restricted feeding, this manner of dispensing, while tolerable, is somewhat undesirable in that equal distribution of feed to each station can not be attained. The present invention remedies this situation by the provision of conveyor apparatus 16 having the dispensing openings 36 in the tubular sections 20, 24, 26, circumferentially offset with respect to the vertical plane, as is illustrated and to be described with regard to FIGS. 4, 5 and 6.

Turning first to FIG. 4, which represents the disposition of the openings 36 in tubing section 22, it can be seen that with respect to the vertical plane, represented by datum line 100, the openings 36 in the section have been circumferentially offset in a clockwise direction, as viewed. The centers of the openings 36 lie along the datum line 101. Further, it should be noted that this offsetting is in a direction opposite to the direction of rotation of the auger 20 as indicated by the arrow 102. It has been found, that with this positioning approximately two-thirds of the feed transported along the conveyor 16 will bypass the first section 22, with the remaining one-third being dispensed through the openings 36.

FIG. 5 represents the disposition of the tubing section 24, and it can be seen that the corresponding dispensing openings 36 therein are further offset with respect to the vertical datum line 100 than were the openings in section 22. In this regard, it should be noted that the degree of offset has progressed from that shown in FIG. 4 in a clockwise direction to the position shown in FIG. 5. It can be appreciated that the disposition of the openings 36 must be such that they fall within the lower half of the circular periphery of the tubing section, otherwise feed would be dispensed only when the tubing was completely filled. Accordingly, with the dispensing openings 36 of tubular section 24 positioned substantially as shown in FIG. 5, it has been determined that approximately one-half of the feed which bypass the first section 22 will be dispensed through said openings.

In FIG. 6, it can be seen that the openings 36 in the last tubular section 26 have been further circumferentially offset with regard to the openings in sections 22 and 24, the degree of offset being almost 360° from datum line 100 in the clockwise direction. With this arrangement it has been found that the remaining feed which has bypassed the initial sections 22 and 24 will be dispensed.

Accordingly, by adjusting the position of the openings 36 in the tubular sections 22, 24, 26, it can be assured that the feed will be equally distributed along the length of the conveyor 16, with the filling of the feeding stations 14 commencing almost simultaneously. Quite obviously, more than three tubular sections maybe employed or the circumferential positioning of the openings 36 in each section varied, the above discussed and illustrated three segment arrangement having been set forth for purposes of illustration. If more than three sections of tubing are employed, the disposition of the dispensing openings 36 may be varied within the limits illustrated in FIGS. 4—6.

From the above, it is believed clear that the present invention provides a system which permits the efficient and effective practice of restricted feeding procedures. Since it is contemplated that various changes, modifications and/or substitutions will occur to those skilled in the art from the preceding description and the drawings, it should be understood that the present invention is not limited to the preferred embodiment illustrated and described herein, the spirit and scope of the invention being defined solely by the claims appended hereto.

The invention I claim is as follows:

1. Feed dispensing apparatus for the restricted feeding of poultry or the like, said apparatus comprising: a hopper designed to accommodate a quantity of feed and having a discharge opening; conveyor apparatus, including drive means, associated with said discharge opening for transporting feed from said hopper to a plurality of feed stations; and a control system for said feed dispensing apparatus, said control system including first and second control means, said first control means being associated with at least one of said feed stations and constituting a means for the energization of said drive means whenever the amount of food in said station is below a preselected level, said second control means being associated with said hopper and operable upon the reduction of feed in said hopper below a predetermined level to disable said drive means, whereby only a prescribed amount of feed may be dispensed.

2. Feed dispensing apparatus as defined in claim 1 wherein said first and second control means are placed in circuit with sad conveyor drive means.

3. Feed dispensing apparatus as defined in claim 2 wherein said control system further includes a timer placed in circuit intermediate a source of power and said drive means and said first and second control means, such that power may be supplied to said drive means only during a selected interval controlled by said timer.

4. Feed dispensing apparatus as defined in claim 1 wherein said second control means is a normally open switch associated with said hopper such that the presence of feed therein will bias said switch to the closed position to permit said conveyor drive means to be energized.

5. Feed dispensing apparatus as defined in claim 4 wherein said hopper includes a boot defining the lower portion thereof and said boot has the discharge opening formed therein, and said normally open switch being associated with said boot.

6. Feed dispensing apparatus as defined in claim 1 wherein said conveyor apparatus includes; a plurality of interconnected tubular sections; flexible auger means operated by said drive means and disposed within said tubular sections and operably associated with said hopper, whereby feed may be transported along the length of said tubular sections; and a plurality of spaced apertures in said tubular sections permitting the dispensing of feed therefrom.

7. Feed dispensing apparatus as defined in claim 6, wherein the first of said tubular sections adjacent said hopper has its openings circumferentially offset with respect to the vertical plane in a direction opposite to the direction of rotation of said auger, the openings in the remaining tubular sections being progressively circumferentially offset from said first mentioned openings further in a direction opposite to the direction of rotation of said auger, the offsets being such that a substantially equal amount of feed will be dispensed from each tubular section during the period of operation of said apparatus.

8. A control system for drive means for mechanical dispensing apparatus that delivers feed from a container to a plurality of feeding stations, said control system comprising: a circuit arrangement for energizing said drive means; first control means for selectively energizing and deenergizing said drive means to maintain the quantity of feed at a selected one of said feeding stations at a predetermined level during an ascertained period of time; and second control means responsive to a selected quantity of feed discharged from said container for disabling said drive means after said selected quantity of feed has been dispensed by said container within said period of time.

9. A control system as defined in claim 8, further including a timer placed in circuit intermediate a source of power and said drive means, such that power may be supplied to said drive means only during preselected intervals.

10. A control system as defined in claim 8 wherein said second control means includes a normally open switch associated with a hopper arrangement for said dispensing apparatus, said switch being biased to the closed position upon the introduction of feed into said hopper to permit energization of said drive means, said switch remaining closed until the feed in said hopper is reduced to a predetermined level at which time said switch will open to disable and prevent further energization of said drive means.

11. Feed dispensing apparatus for supply feed to a plurality of feeding stations, said apparatus comprising: a hopper for accommodating a quantity of feed to be dispensed and having a discharge opening; conveyor apparatus associated with said discharge opening in the hopper for conveying feed to said feeding stations, said conveyor apparatus including, a plurality of interconnected tubular sections, and flexible auger means disposed within said sections and operably associated with said hopper whereby feed can be conveyed from said hopper to said tubular sections for transportation along the lengths thereof, each said tubular section having a plurality of longitudinally spaced openings permitting the dispensing of feed therefrom to said feeding stations; the improvement wherein the first of said plurality of tubular sections adjacent said hopper has its openings circumferentially offset with respect to the vertical plane in a direction opposite to the direction of rotation of said auger, and the remaining tubular sections having their dispensing openings progressively circumferentially offset from said first mentioned openings further in said direction opposite to the direction of rotation of said auger, the offsets being such that said feeding stations may be filled approximately simultaneously with the amount of feed dispensed to each station during a period of operation of said apparatus being approximately equal.

12. Feed dispensing apparatus as defined in claim 11, further including a control system having a first control means associated with at least one of said feeding stations and being operable to deenergize the conveyor apparatus once the feed supply to said station reaches a predetermined level, and permitting energization of said conveyor apparatus upon the reduction of the feed at said station below said level.

13. Feed dispensing apparatus as defined in claim 12, wherein said control system further includes second control means associated with said hopper, said second control means disabling said conveyor apparatus after a predetermined quantity of feed has been dispensed.

14. Feed dispensing apparatus for supplying feed to a plurality of feeding stations, said apparatus comprising: a hopper for accommodating a quantity of feed to be dispensed and having a discharge opening; conveyor apparatus associated with said discharge opening in the hopper for conveying feed to said feeding stations, said conveyor apparatus including, a plurality of interconnected end-to-end tubular sections, and auger means disposed within said sections and operably associated with said hopper whereby feed can be conveyed from said hopper to said tubular section for transportation along the length thereof to said feeding stations; the improvement wherein each of said tubular sections has means for dispensing therefrom only a minor fractional part of the feed being conveyed to all of the feeding stations, said minor fractional parts being approximately equal said means being openings in the tubular sections, the openings in a first tubular section adjacent to said hopper being circumferentially offset with respect to the vertical pane and in a direction opposite to the direction of rotation of said auger, and the openings in a tubular section remote from said hopper being circumferentially offset from the openings in said first tubular section further in said direction, the openings in said first section and said remote sections being on opposite sides of said vertical plane.